(12) United States Patent
Boulkenafed et al.

(10) Patent No.: US 10,830,584 B2
(45) Date of Patent: Nov. 10, 2020

(54) BODY POSTURE TRACKING

(71) Applicant: Dassault Systemes, Velizy Villacoublay (FR)

(72) Inventors: Malika Boulkenafed, Courbevoie (FR); Fabrice Francis Michel, Montrouge (FR)

(73) Assignee: Dassault Systemes, Velizy Villacoublay (FR)

( * ) Notice: Subject to any disclaimer, the term of this patent is extended or adjusted under 35 U.S.C. 154(b) by 617 days.

(21) Appl. No.: 14/288,286

(22) Filed: May 27, 2014

(65) Prior Publication Data
US 2014/0358475 A1 Dec. 4, 2014

(30) Foreign Application Priority Data

May 29, 2013 (EP) .................................. 13305703

(51) Int. Cl.
| | | |
|---|---|---|
| *G01B 21/16* | (2006.01) | |
| *G06F 3/01* | (2006.01) | |
| *G06K 9/00* | (2006.01) | |
| *G06K 9/62* | (2006.01) | |

(52) U.S. Cl.
CPC ............. *G01B 21/16* (2013.01); *G06F 3/017* (2013.01); *G06K 9/00342* (2013.01); *G06K 9/6293* (2013.01)

(58) Field of Classification Search
CPC .... G01B 21/16; G06F 3/017; G06K 9/00342; G06K 9/6293
USPC ........................................................ 702/152
See application file for complete search history.

(56) References Cited

U.S. PATENT DOCUMENTS

| | | | | | |
|---|---|---|---|---|---|
| 5,482,314 | A | * | 1/1996 | Corrado | ................ G01S 15/523 280/735 |
| 5,967,549 | A | * | 10/1999 | Allen | ................ B60R 21/01554 280/730.1 |
| 6,691,074 | B1 | * | 2/2004 | Moriya | ............. G06K 9/00342 702/190 |
| 6,993,378 | B2 | * | 1/2006 | Wiederhold | ....... A61B 5/02055 382/115 |

(Continued)

FOREIGN PATENT DOCUMENTS

| | | | |
|---|---|---|---|
| CN | 101706996 A | * | 5/2010 |
| CN | 102829719 A | * | 12/2012 |

OTHER PUBLICATIONS

Yaqin Tao, Huosheng Hu, Huiyu Zhou, "Integration of Vision and Y. Tao and et al, Inertial Sensors for 3D Arm Motion Tracking in Home-based Rehabilitation", The International Journal of Robotics Research vol. 26, No. 6, Jun. 2007, pp. 607-624.*

(Continued)

*Primary Examiner* — Alexander Satanovsky
*Assistant Examiner* — Douglas Kay
(74) *Attorney, Agent, or Firm* — Hamilton, Brook, Smith & Reynolds, P.C.

(57) ABSTRACT

It is provided a computer-implemented method for performing body posture tracking, comprising the steps of collecting (S10) depth measurements of a body with at least one depth sensor; collecting (S20) inertial measurements with at least one inertial sensor attached to the body; and determining (S30) at least one posture of the body as a function of the depth measurements and the inertial measurements. Such a method improves the field of body posture tracking.

18 Claims, 5 Drawing Sheets

(56) References Cited

U.S. PATENT DOCUMENTS

| | | | | |
|---|---|---|---|---|
| 7,072,777 | B1* | 7/2006 | Wakui | F16F 15/02 702/109 |
| 2011/0110560 | A1* | 5/2011 | Adhikari | G06T 7/246 382/103 |
| 2012/0127157 | A1* | 5/2012 | Adler | A61B 5/0022 345/419 |
| 2012/0197485 | A1* | 8/2012 | Duan | G01M 17/013 701/32.9 |
| 2012/0212366 | A1* | 8/2012 | Alalusi | G01S 7/03 342/118 |
| 2012/0225719 | A1* | 9/2012 | Nowozin | G06K 9/00342 463/36 |
| 2013/0262035 | A1* | 10/2013 | Mills | G01D 9/005 702/188 |
| 2013/0282595 | A1* | 10/2013 | Vijayaraghavan et al. | |
| 2014/0240213 | A1* | 8/2014 | Alaniz | G06F 3/017 345/156 |
| 2014/0358475 | A1* | 12/2014 | Boulkenafed | G01B 21/16 702/152 |

OTHER PUBLICATIONS

Wikipedia, Klaman Filter, Dec. 13, 2013.*
T. Stiefmeier and et al, "Combining Motion Sensors and Ultrasonic Hands Tracking for Continuous Activity Recognition in a Maintenance Scenario", 2006, IEEE.*
Pons-Moll, G., et al "Multisensor-Fusion for 3D Full-Body Human Motion Capture"; 2010 IEEE Conference on Computer Vision and Pattern Recognition, pp. 663-670, Jun. 13-18, 2010.*
Google Patent Search Report regarding intertial sensor attached to the body before May 29, 2013.*
Cucchiara (R. Cucchiara and et al , "Posture Classification in a Multi-Camera Indoor Environment", Image Processing, 0-7803-9134-9/05/$20.00 ©2005 IEEE) (Year: 2005).*
Microsoft Kinect; "Kinect for Windows SDK"; downloaded from Internet Jul. 29, 2014. http://msdn.microsoft.com/ en-us/library/hh855347.aspx (Year: 2014).*
European Search Report and Written Opinion of EP 13 30 5703 dated Nov. 8, 2013.
Gelman, A., et al. "Bayesian Data Analysis" Chapman & Hall, 1996.
Babasior, "Free Track Handbook"; downloaded from Internet Jul. 29, 2014. http://www.free-track.net/fichiers/manuel21en.pdf.
3Gear Systems; "Writing your own Applications", downloaded from Internet Jul. 29, 2014. http://www.threegear.com/latest/doc/api.html.
Knoop, S., et al., "Sensor Fusion for 3D Human Body Tracking with an Articulated 3D Body Model", downloaded from Internet Jul. 29, 2014 http://www.sfb588.uni-karlsruhe.de/old/publikationen/2006/K1_Knoop_ICRA06.pdf.
Zhu, J., et al., "Fusion of Time-of-Flight Depth and Stereo for High Accuracy Depth Maps", Downloaded from Internet Jul. 29, 2014. http://vis.uky.edu/~gravity/publications/2008/sensor_fusion_cvpr08.pdf.
Chiu, WC, et al., "Improving the Kinect by Cross-Medal Stereo". Downloaded from Internet Jul. 29, 2014. http://www.bmva.org/bmvc/2011/proceedings/paper116/paper116.pdf.
Berger, K., et al. "Markerless Motion Capture using multiple Color-Depth Sensors". Downloaded from Internet Jul. 29, 2014. http://www.graphics.tu-bs.dc/media/publications/multikinectsMocap.pdf.
Wii Operators Manuel, System Setup; downloaded from Internet Jul. 29, 2014. http://www.nintendo.com/consumer/downloads/WiiOpMn_setup.pdf.
PlayStation; "PlayStation 3 Support:Manuals" downloaded from Internet Jul. 29, 2014. http://us.playstation.com/support/manuals/ps3/.
Bleser, G. and Stricker, D., "Advanced tracking through efficient image processing and visual-inertial sensor fusion" Computers and Graphics, 33:59-72, 2009.
Kelly, J. and Sukhatme, G.S., "Visual-Inertial Sensor Fusion: Localization, Mapping and Sensors-to-Sensor Self-Calibration" Robotic Embedded Systems Laboratory. Aug. 1, 2010. downloaded from Internet Jul. 29, 2014. http://robotics.use.edu/publications/media/uploads/pubs/645.pdf.
Jacobs, R. and Jordan, M., "Adaptive Mixtures of Local Experts", Neural Computation, MIT 3:79-87 (1991), downloaded from Internet Jul. 29, 2014. www.cs.toronto.edu/~fritz/absps/jjnh91.pdf.
Friedman, J., "Greedy Function Approximation: A Gradient Boosting Machine", downloaded from Internet Jul. 29, 2014. http://docs.salford-systems.com/GreedyFuncApproxSS.pdf.
Smola, A.J., "Learning from Kernels" downloaded from Internet Jul. 29, 2014. http://alex.smola.org/papers/1998/Smola98.pdf.
Moeslund ,T.B. and Granum, E., "A Survey of Computer Vision-Based Human Motion Capture", Computer Vision and Image Understanding; 81:231-238, 2011. Downloaded from Internet Jul. 29, 2014. http://www.sfu.ca/~georness/Research/Articals/technical/Moeslund.pdf.
Zhu, R. and Zhou, Z., "A Real-Time Articulated Human Motion Tracking Using Tri-Axis Inertial/Magnetic Sensors Package", IEEE Transactions on Neural Systems and Rehabilitation Engineering, 12:2, Jun. 2004. Downloaded from Internet Jul. 29, 2014. http://www.znu.ac.ir/data/members/fazli_saeid/DIP/Paper/motion2/01304870.pdf.
Box, G., and Tioa, G., "Wiley: Bayesian Inference in Statistical Analysis" downloaded from Internet Jul. 29, 2014. http://www.wiley.com/WileyCDA/WileyTitle/productCd-0471574287.html.
Murphy, K.P., "Machine Learning, A Probabilistic Perspective" downloaded from Internet Jul. 29, 2014. http://vk.com/doc-44016343_199213512?hash=2ad697dae93b3fea0e.
Shotton, J., et al. "Real-Time Human Pose Recognition in Parts from Single Depth Images" downloaded from Internet Jul. 29, 2014. http://scholar.google.com/scholar_url?h1=en&q=http://dbonline.igroupnet.com/ACM.TOOLS/Rawdata/130103_0839/fulltext/2400000/2398381/p116-shotton.pdf&sa=X&seisig=AAGBfm3L21r8Dw6J1fBpoJC2_Uz_IIkM2g&oi=scholarr.
Durrant-Whyte, H., "Multi Sensor Data Fusion" Australian Centre for Field Robotics, Jan. 22, 2001. Downloaded from Internet Jul. 29, 2014. http://www.acfr.edu.au/pdfs/training/multiSensorDataFusion/dataFusionNotes.pdf.
Witkin, A. and Kass, M., "Spacetime Constraints" Computer Graphics, 22:4, Aug. 1988. http://www.cs.duke.edu/courses/cps124/spring08/assign/03_papers/p159-witkin.pdf.

* cited by examiner

BODY POSTURE TRACKING

RELATED APPLICATION(S)

This application claims priority under 35 U.S.C. § 119 or 365 to European Application No. 13305703.4, filed May 29, 2013.

The entire teachings of the above application(s) are incorporated herein by reference.

FIELD OF THE INVENTION

The invention relates to the field of computer programs and systems, and more specifically to computer-implemented methods, programs, data storage media and systems for performing body posture tracking.

BACKGROUND

Body posture tracking is related to body motion tracking. Systems offering such tracking capacities allow the recognition of a real body's posture or motion (i.e. a time-series of postures). The idea is to describe such posture or motion in a computerized form, for example so as to make use of such computerized data. This may be useful in many applications, including non-exhaustively virtual reality applications, video games, and surgical assistance.

Body posture tracking may be performed based on different technologies. Depth sensors may be used to provide depth measurements (e.g. a depth map) of a body evolving in a location covered by the sensors. Another technology involves inertial sensors that are attached to body parts to provide their 3D positions. Stereo vision cameras can also provide 3D positions. Besides, data fusion has also been used to combine different data in order to predict a posture with relatively high accuracy. So far, several data fusion approaches have been developed.

Data fusion involving depth sensors is a very active field, since current depth sensors, when used alone, fail at describing a three dimensional scene with high fidelity. The two major drawbacks of depth sensors are their limitations in the field of view, resulting in blind spots in the 3D scene, and the lack of precision of the depth map with low discriminative power in close by depths and high sensor noise around object edges.

Data fusion is used in this context to cope with these problems, but currently, accuracy is the subject that has attracted most attention, both in the industry and the academic context. In the industry, the most notable usage of data fusion for improving the accuracy of the depth sensors can be found at "3Gear Systems", where the fusion of two depth sensors and machine learning are associated in order to track accurately the movements of the fingers for a haptic interface. This application is not, to this day, realizable with only one depth sensor.

Usages of data fusion on depth sensors are also largely discussed in academic research. The most notable approaches include:

The fusion of a depth sensor, a stereo vision camera and visual cues extracted in luminance images ("Sensor Fusion for 3D Human Body Tracking with an Articulated 3D Body Model", Knoop et al.);

The fusion of a depth sensor and a stereo vision system, either infrared based or natural light based ("Fusion of Time-of-Flight Depth and Stereo for High Accuracy Depth Maps", Zhu et al., and "Improving the Kinect by Cross-Modal Stereo", Chiu et al.); and The fusion of 4 depth sensors ("Markerless Motion Capture using multiple Color-Depth Sensors", Berger et al.).

Data fusion is also used to improve the accuracy of inertial sensors and circumvent their limitations. The most notable industrial systems featuring sensor fusion on inertial sensors include:

The Nintendo Wii Gaming Console (registered trademark) in which inertial sensors information is fused with Infrared sensors information; and The Playstation 3 Gaming console system dubbed Playstation (registered trademarks) move featuring a RGB camera that tracks the movements of a glowing ball on a "wand" the user keeps in hand, the wand is also equipped with inertial sensors, the console system then performs the fusion.

Data fusion between RGB images and inertial sensor information has also been debated in the academia, for example in the following papers:

"Advanced tracking through efficient image processing and visual-inertial sensor fusion", Bleser et al.; and "Visual-Inertial Sensor Fusion: Localization, Mapping and Sensor-to-Sensor Self-Calibration", Kelly et al.

In this context, there still is a need to improve the tracking of a body posture.

SUMMARY OF THE INVENTION

According to one aspect, it is therefore provided a computer-implemented method (hereafter referred to as "tracking method") for performing body posture tracking. The tracking method comprises the step of collecting depth measurements of a body with at least one depth sensor. The tracking method also comprises collecting inertial measurements with at least one inertial sensor attached to the body. And the tracking method also comprises determining at least one posture of the body as a function of the depth measurements and the inertial measurements.

The tracking method may comprise one or more of the following:

the depth measurements and the inertial measurements constitute time-series, and determining a posture is repeated at each time the method collects depth measurements and/or inertial measurements, the method thereby tracking body motion;

determining a posture at each current time is performed based on predetermined data, on the depth measurements and/or inertial measurements collected at the current time, and on data determined at the previous time;

determining the posture comprises determining and maximizing a probability distribution that assigns probabilities to postures of the body as a function of the depth measurements and the inertial measurements;

at each current time, the probability distribution that assigns probabilities to postures of the body as a function of the depth measurements and the inertial measurements is recurrently obtained by multiplying the probability distribution that assigns probabilities to postures of the body as a function of the depth measurements and the inertial measurements determined at the previous time, by a probability distribution that assigns probabilities to postures of the body as a function of the inertial measurements only and/or a probability distribution that assigns probabilities to postures of the body as a function of the depth measurements only, the probability distribution function of the inertial measurements only and/or the depth measurements only being obtained based on the predetermined data;

the method comprises an initial stage, including the steps of tracking true states of a body taking postures, collecting depth measurements of the body with said at least one depth sensor, and collecting inertial measurements with said at least one inertial sensor attached to the body; and then establishing the function that provides said at least one posture of the body for any values of depth measurements and inertial measurements;

the depth measurements and the inertial measurements constitute time-series and determining a posture is repeated at each time the method collects depth measurements and/or inertial measurements, and establishing the function comprises determining data based on which determining a posture at each current time is performed; and/or the determined data comprise data based on which the method determines a probability distribution that assigns probabilities to postures of the body as a function of the inertial measurements only and a probability distribution that assigns probabilities to postures of the body as a function of the depth measurements only.

According to another aspect, it is provided a computer-implemented method (hereafter referred to as "initial stage method") constituting an initial stage of the above method for performing body posture tracking. The initial stage method comprises the step of tracking true states of a body taking postures. The initial stage method also comprises the step of collecting depth measurements of the body with at least one depth sensor, and collecting inertial measurements with at least one inertial sensor attached to the body. And then the initial stage method comprises the step of establishing a function that provides at least one posture of the body for any values of depth measurements and inertial measurements.

Such initial stage method may comprise one or more of the following:

establishing the function comprises determining data based on which, if for the method for performing body posture tracking, the depth measurements and the inertial measurements constitute time-series and determining a posture is repeated at each time the method collects depth measurements and/or inertial measurements, determining a posture at each current time may be performed; and/or the determined data comprise data based on which the method for performing body posture tracking may determine a probability distribution that assigns probabilities to postures of the body as a function of the inertial measurements only and/or a probability distribution that assigns probabilities to postures of the body as a function of the depth measurements only.

It is further proposed a computer program comprising instructions for performing any or both of the above methods.

It is further proposed a computer readable storage medium having recorded thereon the above computer program.

It is further proposed a system comprising a processor coupled with a memory having recorded thereon the computer program.

The system may further comprise at least one depth sensor and at least one at least one inertial sensor.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
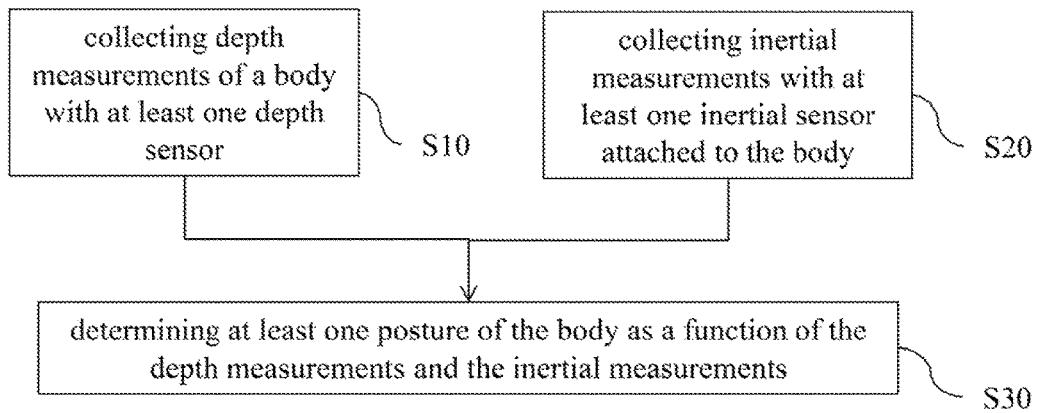
FIGS. 1-2 shows flowcharts of examples of the methods.

FIG. 1 shows a flowchart of an example of the computer-implemented tracking method, for performing body posture tracking. The method comprises collecting S10 depth measurements of a body with at least one depth sensor. The method also comprises collecting S20 inertial measurements with at least one inertial sensor attached to the body. The method also comprises determining S30 at least one posture of the body as a function of the depth measurements and the inertial measurements. Such a method improves the tracking of a body posture.

Existing depth sensor based data fusion systems principally try to circumvent the problem of the sensor accuracy, disregarding almost completely the problem of the system's blind spots, resulting in systems that are hardly robust to occlusions in the 3D scene. This is mainly due to the type of sensors that are used, since fusion is performed with field sensors that are not able to completely capture a 3D scene. On the other hand inertial sensor based data fusion systems try to improve on the performance of the existing sensors and not infer a whole body posture. In this endeavor, the basic knowledge provided by an RGB camera is sufficient. Inference on a whole body model requires more information than what is gathered by the sensors that are used in these applications.

On the contrary, the tracking method of FIG. 1 collects (i.e. gathers/takes) both depth and inertial measurements of the body, and uses both these specific types of measurements to estimate the body posture at S30, since the function contemplated at S30 is a function of both types of measurements (i.e. functions that never depend on one of the depth measurements or inertial measurements, e.g. for all possible values of such measurements, are thus excluded by the method). In other words, the present tracking method performs data fusion between both depth and inertial data. By performing data fusion, it is meant that the determining S30 combines both depth measurements and inertial measurements to output an estimation of the true body posture on which the measurements where collected. The use of data fusion allows to limit sensor accuracy issues (e.g. by diminishing sensing noise and/or errors). The specific data fusion used by the tracking method (i.e. fusing specifically depth and inertial data) allows to do this in a particularly interesting way, with the possibility to infer a whole body model while avoiding blind spots, all this with limited hardware (e.g. the number of sensors at use).

In an example, less than five depth sensors (e.g. only one or two) depth sensors are involved at S10, and/or less than ten, preferably less than five (e.g. only two, three or four) inertial sensors are involved at S20. In such an example, the method involves relatively little hardware, while providing an accurate result for most real postures taken by the body on which the measurements are collected.

The tracking method is advantageous on two grounds. First, the data fusion of depth measurements (e.g. depth maps) and inertial measurements (i.e. inertial sensor information) improves on the detection accuracy of the body model position, because even if both sensors bear signals with noise, the quantity of relevant information from both sensors helps them to cooperate and output a more accurate assessment of the ground truth. Second, using inertial sensors helps to deal with the intractable problem of occlusions, a problem that is encountered when part of the scene is not observed by the depth sensor. Inertial sensors on the other hand are not sensitive to occlusions but are cumbersome to place on the user. The method allows using a very limited amount of inertial sensors that will help recover information that is not accessible to the depth sensor and infer an overall accurate body model posture.

The method is for body posture tracking. A body is any set of articulated limbs, which may be substantially rigid for at least part of them. The bodies that may be tracked by the method may be human bodies or animal bodies. Other types of bodies, such as mechanical bodies, may be tracked as well. A posture of a body is any set of positions of its limbs, allowed by the articulations of the body. Tracking a body posture amounts to inferring the true state of the body posture (i.e. describe the body in terms of positions taken by the limbs), e.g. real-time, as widely known in the art. Indeed, the body may be in motion in a location, or scene. The location may be covered by the at least one depth sensor (i.e. the location is the collecting field of said depth sensor), thus allowing the collecting S10. The method may notably recognize the occurrence of a specific predetermined body posture type (in other words, different types of body postures may be predetermined, and the method may determine that the body has taken an instance of one of them).

The depth measurements and the inertial measurements may constitute time-series. In other words, the collecting S10 and the collecting S20 are each repeated over time, such that the body may take different postures due its motion, resulting in a series of postures. Such a series of postures may be called "motion" or "gesture". The repetitions of the collecting S10 and the collecting S20 may be synchronous (i.e. simultaneous), for at least a part of the repetitions, or asynchronous, for at least a part of the repetitions. Examples are discussed later. In such a case of depth and inertial measurements constituting time-series, the determining S30 of a posture may be repeated at each time the method collects (S10, S20) depth measurements and/or inertial measurements, so as to determine the series of postures of the body. In other words, each time new depth and/or inertial measurements are collected, the method determines S30 a new corresponding posture of the body. This way, the method tracks body motion with relatively high hardware efficiency, with relatively high accuracy and avoiding possible occlusions relatively well. Such method may notably recognize the occurrence of a specific predetermined type body gesture. Gesture types may be predetermined and the method may recognize that the body has taken an instance of a type.

A depth sensor involved at S10 may be any known type of three-dimensional (3D) depth sensor. Such a depth sensor is a sensor exterior to (i.e. detached from) the body (the body is in free motion relative to the sensor) that provides field measurements (many measures for each time step) of the body and the surrounding scene (the "depth measurements") that allow the determination of 3D positions of the body. The depth sensor may for example output a depth model of the body, as explained later.

Examples of depth sensors include:
Microsoft's Kinect (registered trademark).
Stereo-vision Cameras (such as registered trademark PointGrey BumbleBee2);
Structured Light sensors (such as registered trademark Primesense Carmine);
Time of flight sensors (such as registered trademark Mesa Swissranger);
Multi camera rig (such as registered trademark Organic Motion openstage2);
Light Field Camera (such as registered trademark Lytro);
Laser telemeter;
Sonar;
Radar;
Lidar; and/or
Every monocular camera equipped with 3D reconstruction and depth map computation from structure from motion techniques.

Similarly, an inertial sensor involved at S20 may be any known type of inertial sensor, that provides physical measurements (the "inertial measurements") related to the 3D position of a location attached to the body, such location depending on where on the body and how the inertial sensor is attached/linked. An inertial sensor is thus a sensor that senses physical data from which 3D positions can be deduced (the deduced positions being fixed relative to the sensor, e.g. the deduced positions being the positions of the sensor itself).

Examples of inertial sensors include any micro-electromecanical system combining one or more of the following sensors:
Gyrometer;
Accelerometer;
Magnetometer;
Pressure Sensor; and/or
MHD Sensors.

Typically, inertial sensors do not output 3D position measures per se but they output first (speed) and second (acceleration) derivatives. The knowledge of the initial position allows the integration to get back the new position.

Furthermore, physical measurements outputted by inertial sensors also depend on the movements of other body parts from the ones to which the inertial sensors are attached, as known in the art.

The method determines at S30 a posture of the body. In other words, the method provides an estimation of the true state, i.e. the real limb positions, of the body taking a posture. The method performs such determination at S30 as a function of the depth measurements (collected at S10) and the inertial measurements (collected at S20). In other words, the method applies a scheme (the "function") that takes as inputs the measurements and outputs a posture (an estimation of the real posture of the body, possibly the occurrence of a predetermined type, as mentioned above). Such function may itself be composed of sub-functions, as shown in the examples provided later.

The function may be predetermined, and the method may comprise a step of providing the function before the determining S30. Notably, the function may be predetermined in the "initial stage method", which is a method constituting an initial stage of the tracking method. In other words, the initial stage method is performed prior to the tracking method, and constitutes a "calibration" that provides the function used at S30. The initial stage method may also be referred to as "Offline stage", whereas the tracking method may be referred to as "Online stage", such appellations being known in the field.

Figure 2:
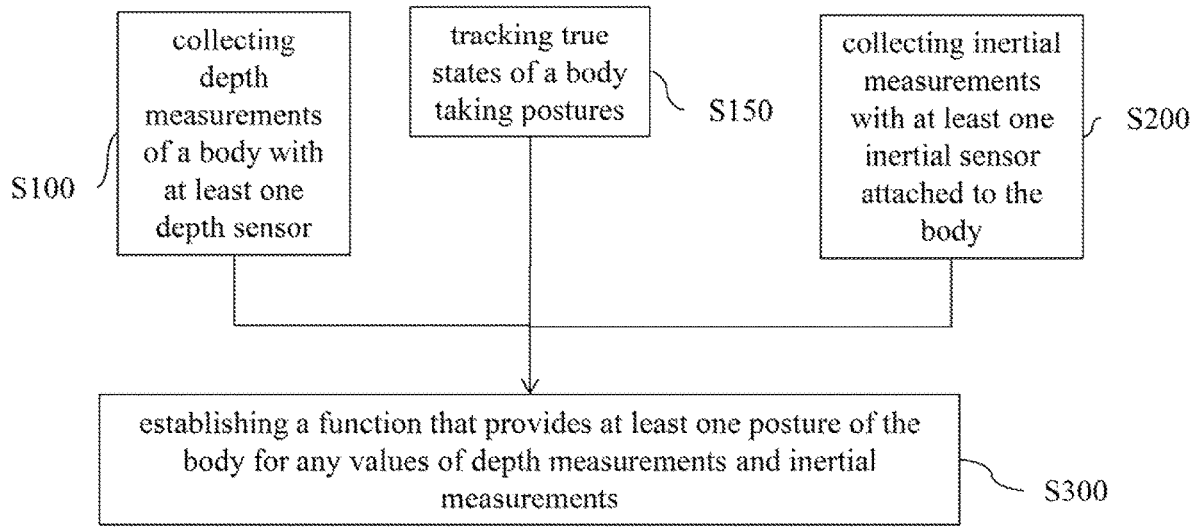

FIG. 2 shows a flowchart of an example of the computer-implemented initial stage method, constituting an initial stage of the method for performing body posture tracking.

The initial stage method comprises tracking S150 true states of a body taking postures. In other words, a body takes different postures (i.e. the body is in motion), e.g. in a location or scene that may be the same or similar (in terms of physical characteristics) to the location or scene of the tracking method. The initial stage method tracks such postures at S150 with any known tracking method providing a result with relatively high accuracy (higher than the tracking method of FIG. 1), thereby providing true states of the body. The true states are substantially the real postures taken by the body. For example, the body may take predetermined postures that are known in advance, the tracking S150 amounting to retrieve such predetermined postures. In a practical example, the tracking S150 is achieved with known methods for providing high accuracy results (involving a high number of depth sensors relative to the method of FIG. 1, for example strictly more than five, and/or involving a high number of inertial sensors relative to the method of FIG. 1, for example strictly more than ten). The initial stage method is typically performed once, possibly at the manufacturer side or at an initial calibration phase of any system implementing the method, while the tracking method based on the function established by said initial stage method may be performed any number of times (as long as the material still functions). For this reason, the costs involved by the high accuracy required by the tracking S150 are not an issue.

In parallel to the tracking S150, the initial stage method comprises collecting S100 depth measurements of the body with at least one depth sensor, and collecting S200 inertial measurements with at least one inertial sensor attached to the body. Any depth sensor involved at S100 and/or inertial sensor involved at S200 may be the same or similar (i.e. of the same type, e.g. the same model) as the sensors involved in the tracking method at S10 and S20. Also, the collecting S100 and/or S200 are performed in the same way or similarly to the collecting S10 and/or S20. The idea is that the initial stage method compares what these sensors output to the true states (that are known thanks to S150), in order to establish the function that relates both data. Thus, the (experimental) conditions of the initial stage method may be the same or similar to the (real) conditions of the tracking method. These machine learning concepts are known from the field of data fusion and are thus not further discussed.

The initial stage method then comprises establishing S300 a function that provides at least one posture of the body for any values of depth measurements and inertial measurements. Such a function may then be used in the tracking method, and for any values collected at S10 and/or S20, the tracking method will be able to perform the determining S30. Examples of the establishing S300 are provided later.

In the case where, in the tracking method, the depth measurements and the inertial measurements constitute time-series and determining S30 a posture is repeated at each time the method collects (S10, S20) depth measurements and/or inertial measurements, establishing S300 the function correspondingly comprises determining data based on which determining a posture at each current time may be performed. The initial stage is indeed associated to the tracking method, such that any example of the tracking method is feasible.

In the specific case that time-series are considered, the initial stage may consider this specificity and the function may actually depend on the current time. This way, time information is used and the tracking is improved. Indeed, the determining S30 at each current time (noted e.g. t+1) may be performed based on predetermined data (e.g. established at S300 of the initial stage), on the depth measurements and/or inertial measurements collected at the current time (depth measurements are collected at repetition of S10 at t+1 and/or inertial measurements are collected at repetition of S10 at t+1), and on data determined at the previous time (t) (e.g. data determined from depth and/or inertial measurements not later than the previous time t, and/or data determined from a repetition of determining S30 not later than the previous time t). This allows real-time body tracking, in an improved way. Examples are provided later.

The methods are computer-implemented. This means that the methods are executed on at least one computer, or any system alike. Thus, steps of the methods are performed by the computer, possibly fully automatically, or, semi-automatically (e.g. steps may be triggered by the user). A typical example of computer-implementation of the method is to perform any or both of the methods with a system suitable for this purpose. The system may comprise a memory having recorded thereon instructions for performing any or both of the methods. In other words, software is already ready on the memory for immediate use. The system is thus suitable for performing any or both of the methods without installing any other software. Such a system may also comprise at least one processor coupled with the memory for executing the instructions. In other words, the system comprises instructions coded on a memory coupled to the processor, the instructions providing means for performing any or both of the methods. Such a system is an efficient tool for tracking body postures.

To cause the system to perform any or both of the methods, it is provided a computer program comprising instructions for execution by a computer, the instructions comprising means for this purpose. The program may be recorded on a data storage medium. The program may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The instructions may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language. The program may be a full installation program, or an update program. In the latter case, the program updates an existing system to a state wherein the system is suitable for performing the method.

Figure 3:
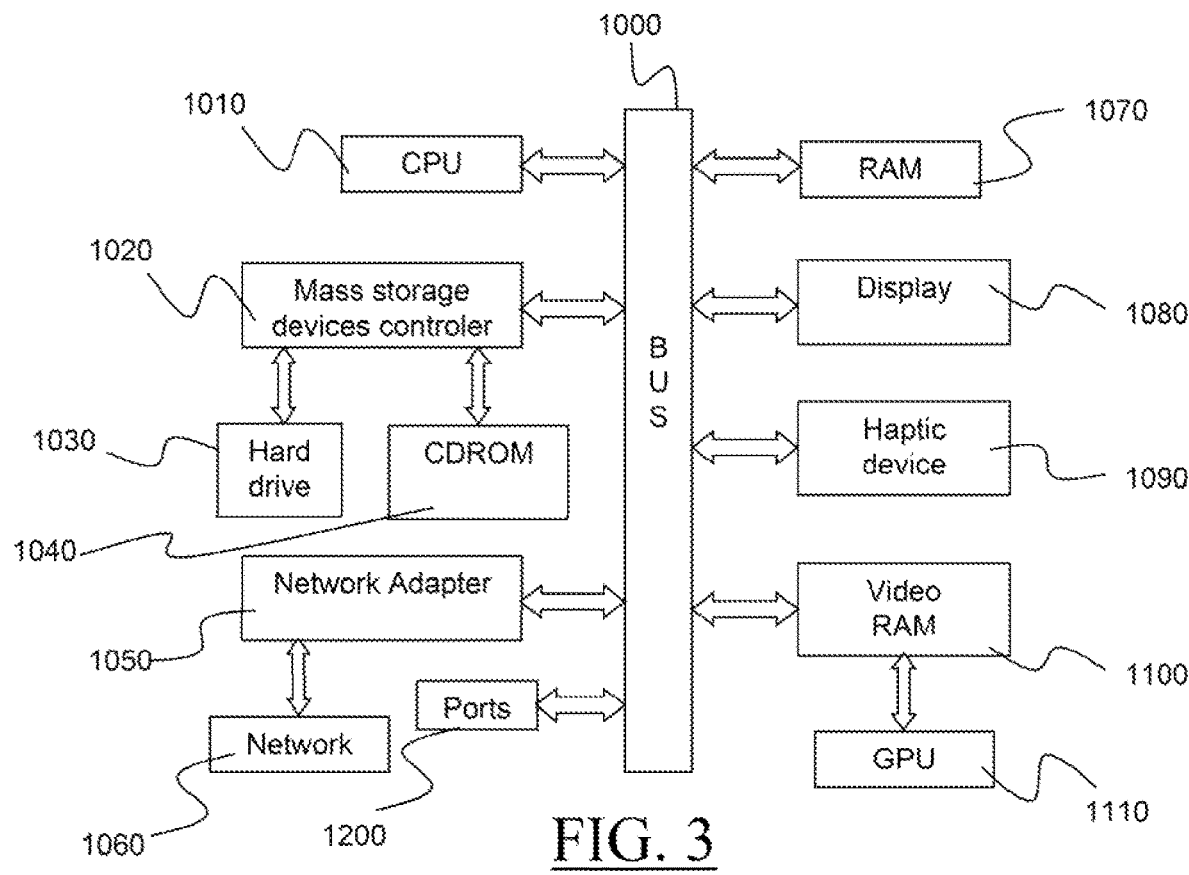
FIG. 3 shows an example of a system.

FIG. 3 shows an example of a system adapted for performing any or both of the initial stage and tracking methods.

The system of the example comprises a central processing unit (CPU) 1010 connected to an internal communication BUS 1000, a random access memory (RAM) 1070 also connected to the BUS. The system is further provided with a graphics processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks, magneto-optical disks, and CD-ROM disks 1040. Any of the foregoing may be supplemented by, or incorporated in, specially designed ASICs (application-specific integrated circuits). A network adapter 1050 manages accesses to a network 1060. The system may also include a haptic device 1090 such as a cursor control device, a keyboard or the like. A cursor control device is used in the system to permit the user to selectively position a cursor at any desired location on screen 1080, as mentioned with reference to FIG. 2. By screen, it is meant any support on which displaying may be performed, such as a computer monitor. In addition, the cursor control device allows the user to select various commands, and input control signals. The cursor control device includes a number of signal generation devices for input control signals to system. Typically, a cursor control device may be a mouse, the button of the mouse being used to generate the signals.

The system further comprises ports 1200 that may allow the connection of at least one depth sensor and/or at least one inertial sensor, involved in the tracking method and/or the initial stage method. Alternatively or additionally, the system may comprise a wireless station for wireless communication with said sensors. The system may in any case comprise any known required hardware for performing collecting steps (S10, S20, S100, S200) or the tracking S150 of any or both the methods.

The tracking method may be used in a variety of applications ranging from video gaming to surgical assistance. In most of these applications, "gesture/motion recognition" and "tracking" are useful. The tracking method may thus enhance such technology fields by improving body posture or motion tracking.

Examples of the tracking method and of the initial stage method are now discussed.

The methods may collect the depth measurements at S10 and/or S100 and organize them as a depth map (i.e. a 3D map of depth measurements). Then, before the determining S30 or the establishing S300, the methods may process the depth map in such a way that the body limbs are detected and fitted to a comprehensive model. Body motion/posture tracking is in the prior art typically performed through time, and through detection and/or prediction, the tracking method may update the position of a limb to its actual spatial position. Tracking is advantageous for a smooth experience since it enforces a correct match between body limbs and also ensures that each body part remains detected in each and every frame.

Figure 4:
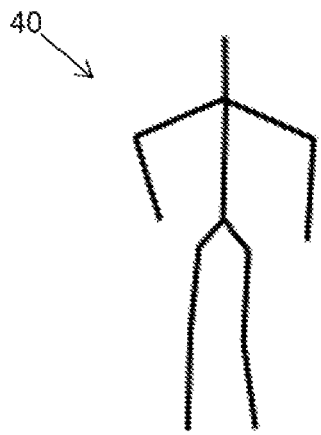
FIGS. 4-10 illustrate the methods.
Figure 5:
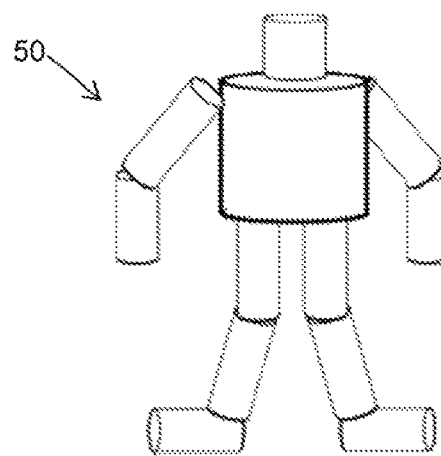

A body model may be used by the methods of the examples to translate the recognized posture or gestures in an integrated fashion. Specifically, the methods may translate the depth measurements to compute parameters of a body model. Examples of body models include wireframe skeletons, such as skeleton 40 of FIG. 4, or cylindrical body shapes such as cylindrical body shape 50 of FIG. 5. These models are parameterized (e.g. each wire position in the wireframe skeleton or the cylinders' lengths and widths in the cylindrical model). Some of the parameters may be given by the user, but most or all of them may be directly brought by the tracking method. The completed body model can then be used to animate an avatar or any representation of the body for representation on a display device, such as avatar 104 on display device 102 exemplified on FIG. 8. The exact management of body models is however out of the scope of the present discussion, as this is known from the prior art.

There exist many solutions that aim at extracting a body model from a depth map and that may be implemented by the methods, following S10 and/or S100. Reviewing them would be out of the scope of this discussion. A known example is to use visual cues and depth information to generate a hypothetical body model. This model is then confronted to a set of constraints as well as its previous state to infer the actual body model position.

However sophisticated the body model tracking is, tracking artifacts always subsist. These artifacts are due to the inherent inaccuracy of the depth motion sensors as well as a purely physical concern: since the depth sensor analyzes the scene from a vantage point, all blind spots from this vantage point are also blind spots in the depth sensor perception, resulting in incomplete scene detection. The situations where there are blind spots in the scene are also called occlusions.

Figure 6:
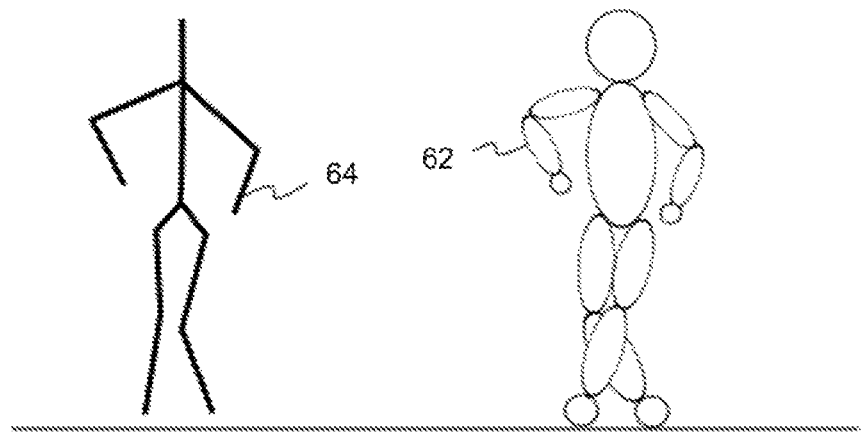
Figure 7:
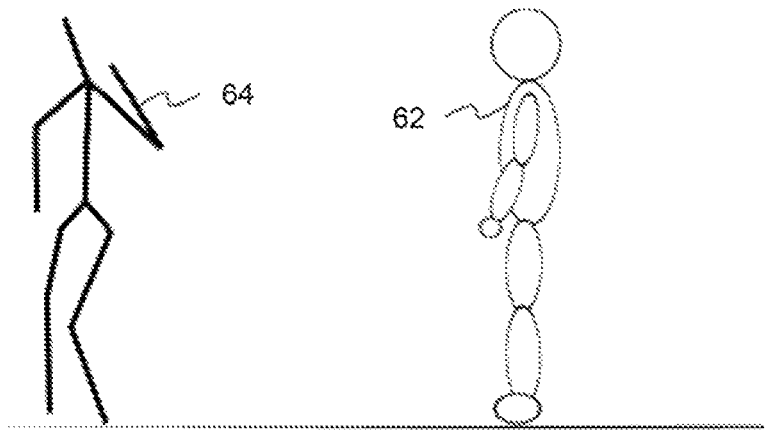

In FIGS. 6-7, two such situations are depicted in which only self-occlusions are shown. On the right of each figure can be seen a schematic representation of the actual user position 62, and on the left is the resulting body model 64 (a skeleton view is used as a practical example). In the first case (FIG. 6) the user is only crossing his legs, and this situation is problematic to most body model solvers and usually dealt with using additional constraints or model priors, which may be cumbersome. However, there is no amount of additional constraint or model prior that can help solve the problem encountered in FIG. 7. FIG. 7 shows the case where the user only shows his side to the depth sensor, in this case, half his body is occluded, this type of occlusion is simply intractable to a depth sensing unit alone. In this case, the body model ends up in a garbled state in which the solver mismatches the occluded body parts with parts present in the scene.

The tracking method of the examples brings a solution to this technical problem as it allows the creation of a body model that is free of occlusions.

Recently, inertial sensors have gained a lot of attention, notably through their use in video game consoles. Unfortunately, recovering a whole body model from inertial sensors requires a large amount of them (between 10 and 20 inertial sensors placed in different locations on the body). This large amount is prohibitive for most applications since recovering the body model would require the user to be outfitted with these sensors every time.

As a viable alternative, the tracking method proposes to make use of both worlds. Indeed using a limited amount of body attached inertial sensors cannot provide the system with a full body posture but instead only a set of probable body postures at best. However the complementary usage of a depth sensor brings back the constraints lost by removing most body attached inertial sensors. Wearing few, for example two or three, sensors is minimally intrusive for the user, but at the same time reduces mismatches due to occlusions in the depth map, in a surprising extent.

Figure 8:
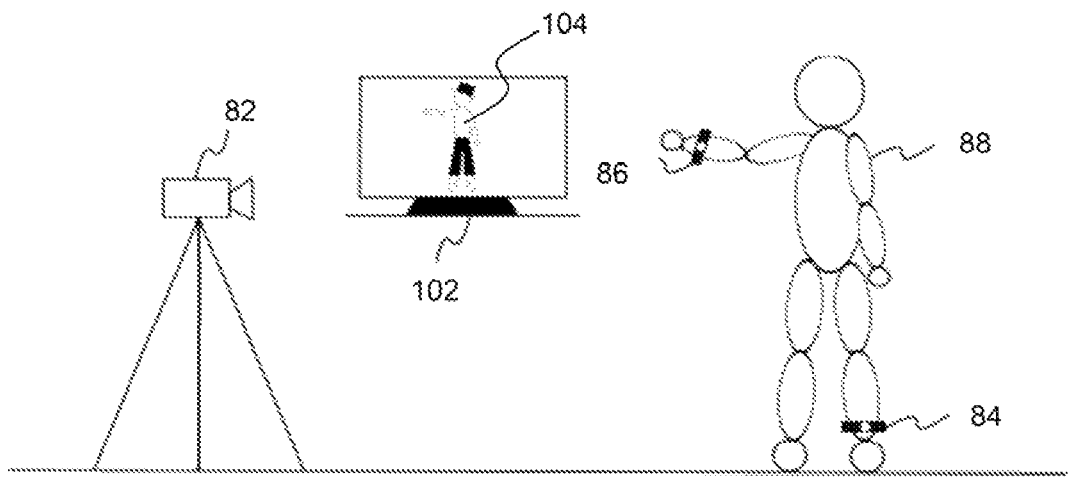

As depicted in FIG. 8, the system of the examples may consist in a depth sensor 82 and a small amount of wearable inertial sensors (two: 84 and 86) attached to the user's body 88. The purpose of the methods is to accurately track the person's body movement through time and apply it to a computer generated body model, that is then shown on a display device 102 in the example.

Several technical terms used in the following are now defined and discussed.

A state or body state is a description of the motion or the absence of motion of the body. A true state is a description that matches with high accuracy the real position of the body. A true body state is a time evolving body model that measures with the highest possible precision the real position such that the true state and the real position can be virtually identical. For example, the highest distance error between a 3D position provided for any point of any limb of the body and the real position of said point is lower than a predetermined threshold, e.g. equal to a percentage of the height of the body, e.g. 1%, 0.1% or 0.01%.

A body model is a parametric representation of the body. As discussed earlier, several types of body models can be considered: a wireframe skeleton or a cylindrical model are just two examples. Mathematically a body model can be fully represented by a vector of the model parameters (e.g. nodes positions and limbs length in the wireframe skeleton case).

The depth model is the set of depth measurements (represented mathematically as a vector of measurements for each and every body part) acquired at S10 or S100 with the depth sensor(s) that incompletely represents the body state. The following examples use the depth model to infer the true body state. The depth model in itself can be used to create a body model but could also be a body model (in which case the depth model is represented mathematically by a vector of parameter measurements for each and every part of the body model). The term of depth model is used here for more generality. The examples use a body model extracted from the depth measurements as a depth model.

The inertial model is the set of inertial measurements (represented mathematically as a vector of measurements for each and every sensor location) acquired at S20 or S200 with the inertial sensor(s) that incompletely represents the body state. The following examples use the inertial model to infer the true body state. The inertial model in itself can be used to create a body model but could also be a body model (in which case the inertial model is represented mathematically by a vector of body model parameter measurements collected on sensors placed at fixed and predefined places on the body). The term of inertial model is used here for more generality. The examples use the inertial sensor measurements as an inertial model.

The tracking method is based on the observations that both the depth sensor and the motion sensors only give an incomplete assessment of the body parts position, but this incomplete information can be fused to restitute an accurate representation of the body motion.

As explained earlier, the methods for in fine performing the tracking may be separated in two stages.

The first stage, denoted as initial or offline stage, corresponds to the stage where all the parameters of the algorithm are evaluated, and this is done once and for all. The term offline refers to the fact that this stage is transparent to the user of the tracking method and even if it has large computational needs, time to do computations can be taken. This stage in the following examples relies heavily on machine learning algorithms and especially on regression machine learning algorithms.

The second stage, denoted as online stage or tracking method, gathers all the steps of the method that are done in real-time during the body model tracking. This stage in the following examples decomposes in three technologies:

Extraction through time of the depth model and inference of the probability of the true body state.

Extraction through time of the inertial model and inference of the probability of the true body state.

Possibly asynchronous sensor fusion of both true body state probabilities in order to augment both the accuracy of the body model and the completeness of the model.

Figure 10:
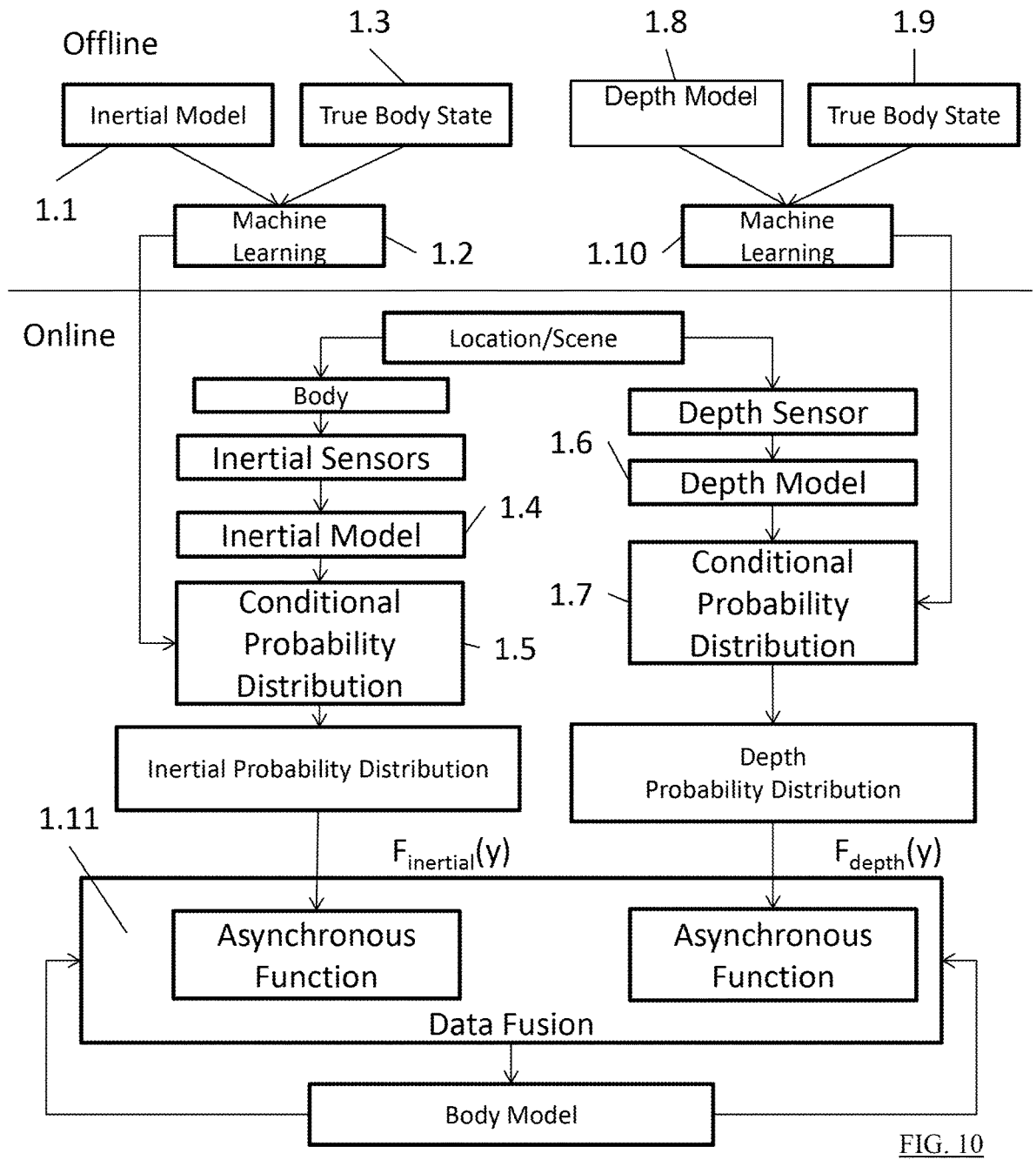

FIG. 10 illustrates the technological workflow and is described later.

An example of the offline initial stage is now discussed with reference to FIG. 9, which presents an example of a flowchart representing actions included in the establishing S300. This example of the initial stage corresponds to an online tracking method performing body motion tracking as explained earlier, i.e. wherein the depth measurements and the inertial measurements constitute time-series, and determining a posture is repeated at each time.

Furthermore, the tracking method corresponding to this example further presents the specificity that determining a posture at S30 at each current time is performed based on predetermined data, on the depth measurements and/or inertial measurements collected at the current time, and on data determined at the previous time, namely by determining and maximizing a probability distribution that assigns probabilities to postures of the body as a function of the depth measurements and the inertial measurements. In other words, the method determines a probability distribution that assigns (i.e. provides) a probability that the body took a specific posture (for all postures) when collecting at S10 and S20 the depth and inertial measurements, given the values of said measurements. Then the method may simply maximize (i.e. determine the maximum or the maximum's argument) such probability distribution, for example by outputting the argument of the maximum of the probability distribution. Said argument is considered to be the most probable posture in the example.

In such a case, the predetermined data, based on which determining the posture is performed at S30 and that the initial stage determines at S300, may comprise data based on which the method for performing body posture tracking may determine a probability distribution that assigns probabilities to postures of the body as a function of the inertial measurements only and/or a probability distribution that assigns probabilities to postures of the body as a function of the depth measurements only. In other words, two probability distributions are contemplated: both assign probabilities to postures based on only one of the two types of data collected (depth or inertial). This keeps computational costs low, as illustrated in the following.

In order to infer the true body state given a set of incomplete and/or inaccurate measurements, the tracking method of the example first computes the probability distribution of the true body state being in state A given that the depth or inertial model is in state A'. Computing the probability distribution of the true body state given either the depth or inertial model is done with a classical Machine Learning algorithm for regression (step S930 on FIG. 6), that may implement any or a combination of:

Mixture of Experts for Regression (e.g. as described in "Adaptive mixtures of local experts", Jacobs et al.);

Boosted Regression (e.g. as described in "Greedy Function Approximation: A Gradient Boosting Machine", Friedman et al.);

Kernel Ridge Regression (e.g. as described in "Learning with Kernels", Smola et al.);

Markov Chain Monte Carlo (e.g. as described in "Bayesian Data Analysis", Gelman et al.); or Approximate Bayesian Computation (e.g. as described in "Bayesian Data Analysis", Gelman et al.).

Machine Learning algorithms use a training dataset that is constructed as explained in the following.

Let us consider y as a true body state observation of the body. y is characterized as a vector of input (provided at step S920 on FIG. 9, and collected at S150) in space Y. Concurrently let us consider m as either the inertial or depth model vector (provided at step S920 on FIG. 9 and collected at S100 or S200), in space M. Each m and y are acquired at the same time so that they are perfectly matching. The training data set consists in a collection of N pairs m and y: $D=\{(m,y)_i, m \in M, y \in Y, i \in [1,N]\}$ (provided at step S900 on FIG. 9), using this data set we are interested in the construction of the conditional probability P (Y=y|M=m). In all practicality N may be fairly large to be able to cover most adequately all dimensions of the problem. N may for example be as large as k times the number of dimensions in Y times (i.e. multiplying) the number of dimensions in m, with k superior to 100 or to 500, and/or inferior to 2000 or to 1500, preferably equal to 1000.

The creation of the training data set D is straightforward. The true body state observations y can be acquired at S150 using any known motion capture paradigm as explained earlier. An example includes the algorithm described in the paper entitled "A survey of computer vision-based human motion capture", by Moeslund et al. The body can also be fitted with many inertial sensors, much more than what is required for the tracking method, to be able to capture the movement of each body part. This may be done as described in the paper entitled "A Real-Time Articulated Human Motion Tracking Using Tri-Axis Inertial/Magnetic Sensors Package", by Zhu et al.

The corresponding m model vectors are acquired at the same time and are the same as the ones that would be acquired during the online phase (after learning, during usage), and correspond to the depth model in one case and to the inertial model in the other.

Then, given a new model vector $m_{new}$ we get the distribution of possible true body states as $$P(y | m_{new})$$
$$\forall y \in Y$$

Known regression algorithms (step S930 on FIG. 9) are often parametric and model the conditional probability profile P (Y=y|M=m) using a mixture of nonlinear functions. The learning stage of the algorithm may consist in finding the parameters of the model.

Let us consider linear regression as an example of an algorithm that can be applied at S930, such as the algorithm described in the reference entitled "Bayesian Inference in Statistical Analysis", Box., or "Murphy, Kevin P. *Machine learning: a probabilistic perspective*. The MIT Press, 2012".

Each ground truth observation y is modeled as a linear expression of the measurement m as:

$y_i = Am_i + \varepsilon$ where A is a matrix of size the dimension of M times the dimension of Y, and $\varepsilon$ is an independent and identical normally distributed random noise: $\varepsilon_t \sim N(0,\Sigma)$ where $\Sigma$ is the noise covariance matrix. Using this last equation, the conditional probability of y given m can be written:

$$P(y|m) = N(y|Am,\sigma) = \frac{1}{\det(\Sigma)\sqrt{2\pi}} \exp\left(\frac{-1}{2}(y-Am)^T \Sigma^{-1}(y-Am)\right)$$

A and E can be computed analytically maximizing the fit on D, we get:

$$A=(\underline{m}^T\underline{m})^{-1}\underline{m}^T\underline{y}$$

$$\Sigma=\text{cov}(\underline{y}-A\underline{m})$$

where $\underline{y}$ and $\underline{m}$ are the matrices collecting all the training samples.

We see here that with the knowledge of D the method can completely define the probability P (Y=y|M=m).

For a full profile of the conditional probability, the initial stage may preferably use (instead of linear regression) non-parametric methods such as MCMC (Markov Chain Monte Carlo) or ABC (Approximate Bayesian Computation).

Figure 9:
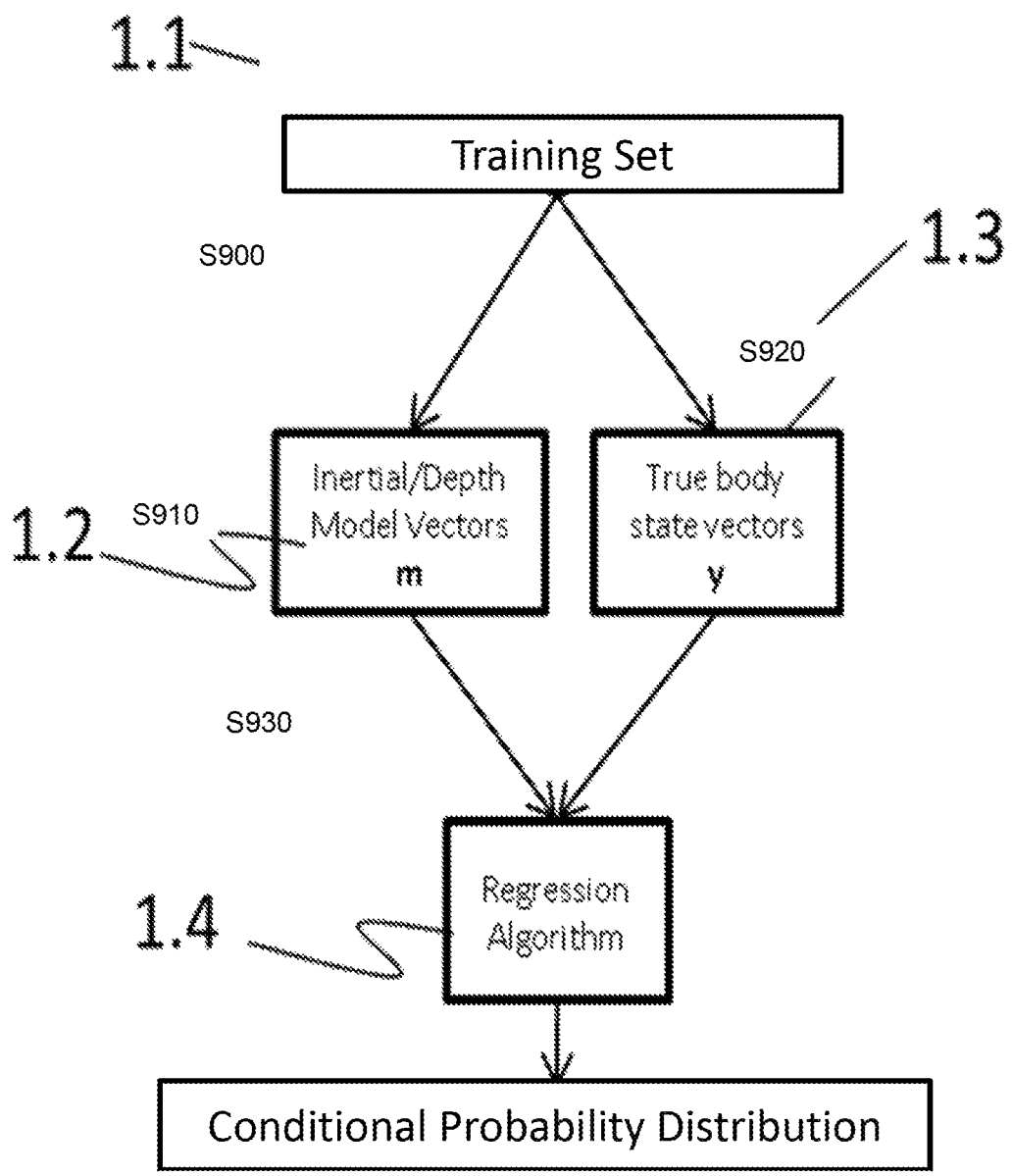

An example of the online tracking stage corresponding to the initial stage of FIG. 9 is now discussed with reference to FIG. 10.

As explained earlier, in this example the depth measurements and the inertial measurements constitute time-series, and determining a posture is repeated at each time the method collects depth measurements and/or inertial measurements. Moreover, determining a posture at each current time is performed based on predetermined data (during the initial stage), on the depth measurements and/or inertial measurements collected at the current time, and on data determined at the previous time. Furthermore, determining the posture comprises determining and maximizing a probability distribution that assigns probabilities to postures of the body as a function of the depth measurements and the inertial measurements.

In this example, at each current time (noted t+1), the probability distribution $P(y_{t+1}|X_{t+1}, Z_{t+1})$ that assigns probabilities to postures y of the body as a function of the depth measurements and the inertial measurements is recurrently obtained (i.e. a recurrence is predefined to determine the probability distribution as the determining S30 is repeated) by multiplying the probability distribution $P(y_t|X_t, Z_t)$ that assigns probabilities to postures y of the body as a function of the depth measurements and the inertial measurements determined at the previous time (noted t), by the probability distribution $P_{inertial}(y_{t+1}|x_{t+1})$ (e.g. determined during the initial stage) that assigns probabilities to postures y of the body as a function of the inertial measurements only; and/or by the probability distribution $P_{depth}(y_{t+1}|z_{t+1})$ (e.g. determined during the initial stage) that assigns probabilities to postures y of the body as a function of the depth measurements only. As explained earlier, the probability distribution function of the inertial measurements only and/or the depth measurements only may be obtained based on the predetermined data (e.g. determined during the initial stage). This is detailed below.

The method may comprise after collecting S10 depth measurements the extraction of a body model from a depth map, as discussed earlier. This corresponds to step 1.6 on FIG. 10.

Technologies allowing the extraction of a body model from a depth map are out of the scope of the present discussion. Current technologies track specific landmarks places on the body joints and recreate a wireframe skeleton of the body or track body parts position and orientations to recreate a cylinder based body model. An adequate method for body model extraction can be found in the paper entitled "Real-Time Human Pose Recognition in Parts from Single Depth Images", by Shotton et al.

We denote the depth model vector as z (provided at step 1.8 of FIG. 10), in the space of depth model vector observations Z and y as a true body state observation of the body. y is characterized as a vector of input (provided at step 1.9 of FIG. 10) in space Y. The conditional probability profile $P_{depth}(y|Z=z)$ is estimated using the procedure described in the discussion regarding the offline initial stage (step 1.10 of FIG. 10). The obtained distribution is used in conjunction with the inertial sensor conditional probability distribution to extract the most probable body state.

Given a new and never before seen depth model vector z, the most probable body model state that could be inferred by the depth sensor is obtained by maximization of the probability:

$$y = \underset{y}{\mathrm{argmax}} P_{depth}(Y=y|Z=z).$$

This is step 1.7. We are however interested in the whole probability profile expressed as a function of y: $f_{depth}(y) = P_{depth}(Y=y|Z=z)$.

The method may comprise after collecting S20 inertial measurements the extraction of a body model from a few inertial sensors placed onto the body, as discussed earlier. This corresponds to step 1.4 on FIG. 10.

The inertial sensors output a signal time series that bears some information about the state of the body part it is mounted on but also subtle variations associated with the movement of other body parts. The inertial sensor's signal may be highly corrupted by noise, a preprocessing step involving signal filtering and signal processing being thereby advantageous. Describing these known technologies is outside the scope of this discussion. Examples of such technologies that work can be for instance found in the paper entitled "A Real-Time Articulated Human Motion Tracking Using Tri-Axis Inertial/Magnetic Sensors Package", by Zhu et al.) and the references therein.

As before, let us consider y as a true body state observation of the body. y is characterized as a vector of input (step 1.3) in space Y. Concurrently let us consider x as the inertial model vector (step 1.1), in space X. The conditional probability profile $P_{inertial}(y|X=x)$ is estimated using the procedure (step 1.2) described in the Machine Learning Technology section.

Given a new and never before seen inertial model vector x, the most probable body model state that could be inferred with the inertial sensor is obtained by maximization of the probability:

$$y = \underset{y}{\mathrm{argmax}} P_{inertial}(Y=y|X=x).$$

We are however interested in the whole probability profile expressed as a function of y: $f_{inertial}(y) = P_{inertial}(Y=y|X=x)$.

Now, the method may implement synchronous or asynchronous data fusion at S30 (such general types of data fusion being discussed in the paper entitled "Multi Sensor Data Fusion", by Durrant-Whyte) of the depth model and the inertial model.

Let us consider a time governed process. For each time step t we want to know the value y that maximizes the probability $P(y_{t+1}|X_{t+1}, Z_{t+1})$ where $X_{t+1}$ is $\{x_{t+1}, x_t, x_{t-1}, \ldots, x_0\}$ and $Z_{t+1}$ $\{z_{t+1}, z_t, z_{t-1}, \ldots, z_0\}$ is the set of depth and inertial models acquired so far. This maximizing value $y^*$ is evaluated at time t+1 and corresponds to the $(t+1)^{th}$ value of y. In order to get the function of y, $P(y_{t+1}|X_{t+1}, Z_{t+1})$, the method uses data fusion techniques that will correlate this quantity with $P_{depth}(y_{t+1}|Z=z_{t+1})$ and $P_{inertial}(y_{t+1}|X=x_{t+1})$.

Using Bayes rule (such as described in the paper entitled "Bayesian Data Analysis", by Gelman et al.), we can rewrite $P(y|X_{t+1}, Z_{t+1})$ as:

$$P(y_{t+1}|X_{t+1}, Z_{t+1}) = P(y_{t+1}|x_{t+1}, z_{t+1}, X_t, Z_t)$$

$$= \frac{P(x_{t+1}, z_{t+1}|y_{t+1}, X_t, Z_t)P(y_{t+1}|X_t, Z_t)}{P(y_{t+1}, z_{t+1}|X_t, Z_t)}$$

using the independence of the measurement of different sensors given the y, we can rewrite this as $$P(y|X_{t+1},Z_{t+1}) \propto P(x_{t+1},z_{t+1}|y_{t+1},X_t,Z_t)P(y|X_t,Z_t) \propto P(x_{t+1}|y_{t+1},X_t)P(z_{t+1}|y_{t+1},Z_t)P(y_{t+1}|X_t,Z_t)$$

where $\propto$ is the proportionality symbol removing the terms independent of y.

Assuming that measurement noise is uncorrelated with time, we have $$P(z_{t+1}|y_{t+1},Z_t) = P(z_{t+1}|y_{t+1})$$

using Bayes rule again:

$$P(z_{t+1}|y_{t+1}) \propto \frac{P(y_{t+1}|z_{t+1})}{P(y_{t+1})}$$

P(y) can be inferred through a probabilistic or physical model of the true body state, considering the high dimensionality of the state space we used a uniform density for P(y).

This final model leads to:

$$P(y_{t+1}|X_{t+1},Z_{t+1}) \propto P_{depth}(y_{t+1}|z_{t+1})P_{inertial}(y_{t+1}|x_{t+1})P(y_{t+1}|X_t,Z_t) = f_{depth}(y_{t+1})f_{inertial}(y_{t+1})P(y_{t+1}|X_t,Z_t)$$

Marginalization of the joint probability yields:

$$P(y_{t+1}|X_t,Z_t) = \int dy_t P(y_{t+1}|y_t,X_t,Z_t)P(y_t|X_t,Z_t).$$

However the true state is not dependent on the observations so we have $$P(y_{t+1}|y_t,X_t,Z_t) = P(y_{t+1}|y_t).$$

This last quantity (the state transition probability) can be obtained through the use of a physical model of the true body state or through extensive learning in the parameter space. An example of a physical body model may be found in the paper entitled "Spacetime Constraints", by Witkin et al.

The method uses a Dirac (centered in $y_t$) distribution for the state transition probability, leaving out the state prediction to the sensors only. It can be noted however that using the Dirac distribution is part of the general model where we could have used a physical model of the true body state, namely the case of the resting body model.

We get the recurrence used by the method as mentioned above:

$$P(y_0,X_0,Z_0) = P(y_0|x_0,z_0) = P_0$$

$$P(y_{t+1}|X_{t+1},Z_{t+1}) \propto P_{depth}(y_{t+1}|z_{t+1})P_{inertial}(y_{t+1}|x_{t+1})P(y_t|X_t,Z_t).$$

$P_0$ may be initialized either with a normal law with identity variance and zero mean or a prior body model $P(y)$ computed beforehand on the ground truth data with Monte Carlo Sampling.

Even if normalization of $P(y_t|X_t,Z_t)$ is not required, it may be conducted at regular intervals by the method to prevent the quantity to reach virtually zero in machine precision.

As illustrated by step 1.11, in the case of asynchronous data streams, techniques such as track-to-track filtering may be used to process the data stream as the data comes. Track-to-track filtering updates the probabilities of the body model motion as each of the probabilities $P_{depth}(y|Z=z)$ and $P_{inertial}(y|X=x)$ are given, which in turn relates to the sensors frequency.

The recursion then becomes:

$$P(y_0|X_0,Z_0)=P_0$$

$$P(y_{t+1}|X_{t+1},Z_{t+1}) \propto P_{inertial}(y_{t+1}|x_{t+1})P(y_t|X_t,Z_t)$$

or $$P(y_{t+1}|X_{t+1},Z_{t+1}) \propto P_{depth}(y_{t+1}|z_{t+1})P(y_t|X_t,Z_t).$$

Once the probability of the body model motion given each sensor output is obtained, the most probable body model motion is obtained through maximization of the probability:

$$y^*_{t+1} = \underset{y_{t+1}}{\mathrm{argmax}} P(y_{t+1}|x_{t+1},z_{t+1}).$$

While this invention has been particularly shown and described with references to example embodiments thereof, it will be understood by those skilled in the art that various changes in form and details may be made therein without departing from the scope of the invention encompassed by the appended claims.

The invention claimed is:

1. A method for performing body posture tracking, comprising:
   in an offline stage of machine-learning of a first probability distribution and of a second probability distribution:
   (a) providing, (i) at least one first inertial sensor attached to a first body taking postures, (ii) at least one first depth sensor detached from the first body taking postures, and (iii) a first computer system having a processor;
   (b) by the first body, performing a motion that forms a first gesture, the first gesture comprising a first series of postures;
   (c) in real-time and continuously during the first gesture of the first body:
   tracking each respective posture of the first series of postures,
   by the at least one first inertial sensor, collecting inertial measurements of the first body,
   by the at least one first depth sensor, collecting depth measurements of the first body, and
   by the processor of the first computer system, learning the first probability distribution and the second probability distribution, the learning comprising:
   constructing a training dataset comprising depth measurements of the first body and inertial measurements of the first body; and
   by using the training dataset:
   updating parameters of the first probability distribution, the updating of the parameters comprising, for each respective posture of the first series of postures, comparing the tracked respective posture with one or more inertial measurements of the first body, thereby training the first probability distribution to assign probabilities to postures of a moving body as a function of inertial measurements of the moving body;
   updating parameters of the second probability distribution, the updating of the parameters comprising, for each respective posture of the first series of postures, comparing the tracked respective posture with one or more depth measurements of the first body, thereby training the first probability distribution to assign probabilities to postures of a moving body as a function of depth measurements of the moving body;
   in an online stage of body posture tracking:
   (a) providing (i) at least one second inertial sensor attached to a second body, (ii) at least one second depth sensor detached from the second body, (iii) a second computer system having a processor, and (iv) the first probability distribution and the second probability distribution;
   (b) by the second body, performing a motion that forms a gesture, the gesture comprising a second series of postures, the second series of postures comprising one or more first postures and one or more second postures, the one or more first postures occurring before the one or more second postures occur;
   (c) in real-time and continuously during the gesture:
   by the at least one second depth sensor, collecting depth measurements of the second body;
   by the at least one second inertial sensor, collecting inertial measurements of the second body; and
   by the processor of the second computer system, determining the series of postures, the determining of the second series of postures comprising, for each respective posture of the second series of postures:
   determining the respective posture, the determining of the respective posture comprising determining and maximizing a probability distribution that assigns probabilities to postures of the second body as a function of depth and inertial measurements of the second body collected at a current time of the respective posture, the probability distribution being recurrently obtained by multiplying the probability distribution that assigns probabilities to postures of the second body as a function of depth and inertial measurements collected at a previous time by the first probability distribution taking as input inertial measurements of the second body collected at the current time and by the second probability distribution taking as input depth measurements of the second body collected at the current time;
   wherein the determining of the one or more first postures is performed before the one or more second postures occur.

2. The method of claim 1, wherein determining a respective posture is repeated at each time that the method collects depth measurements and/or inertial measurements; and/or determining a respective posture is repeated at each time that is a multiple of at least one predetermined time step;

the method thereby tracking body motion.

3. The method of claim 1, wherein the depth measurements and the inertial measurements constitute time-series;

wherein determining a respective posture is repeated at each time that the method collects depth measurements and/or inertial measurements; and wherein learning of the first probability distribution and of the second probability distribution comprises determining data based on which determining a respective posture at each current time is performed, the data including one or more of the depth measurements, the inertial measurements, and the current time of the respective posture.

4. The method of claim 3, wherein the determined data comprise data based on which the method learns the first probability distribution and the second probability distribution.

5. The method of claim 1, wherein determining the respective posture further comprises determining data based on which, if for the online stage, the depth measurements and the inertial measurements constitute time-series and determining whether the respective posture is repeated at each time the method collects depth measurements and/or inertial measurements, determining a posture at each current time may be performed.

6. The method of claim 5, wherein the determined data comprise data based on which the method may learn the first probability distribution and/or the second probability distribution at the offline stage.

7. The method of claim 1, wherein during the gesture, at least one posture of the second series of postures is such that a part of the body is occluded by another part of the body, each posture determined by the method being free of occlusion.

8. A non-transitory computer-readable medium configured to store instructions for performing body posture tracking, the instructions, when loaded and executed by a processor, causing the processor to:

in an offline stage of machine-learning of a first probability distribution and of a second probability distribution:
  (a) providing, (i) at least one first inertial sensor attached to a first body taking postures, (ii) at least one first depth sensor detached from the first body taking postures, and (iii) a first computer system having a processor;
  (b) by the first body, performing a motion that forms a first gesture, the first gesture comprising a first series of postures;
  (c) in real-time and continuously during the first gesture of the first body:
    tracking each respective posture of the first series of postures,
    by the at least one first inertial sensor, collecting inertial measurements of the first body,
    by the at least one first depth sensor, collecting depth measurements of the first body, and
    by the processor of the first computer system, learning the first probability distribution and the second probability distribution, the learning comprising:
      constructing a training dataset comprising depth measurements of the first body and inertial measurements of the first body; and
      by using the training dataset:
        updating parameters of the first probability distribution, the updating of the parameters comprising, for each respective posture of the first series of postures, comparing the tracked respective posture with one or more inertial measurements of the first body, thereby training the first probability distribution to assign probabilities to postures of a moving body as a function of inertial measurements of the moving body;
        updating parameters of the second probability distribution, the updating of the parameters comprising, for each respective posture of the first series of postures, comparing the tracked respective posture with one or more depth measurements of the first body, thereby training the first probability distribution to assign probabilities to postures of a moving body as a function of depth measurements of the moving body;

in an online stage of body posture tracking:
  (a) providing (i) at least one second inertial sensor attached to a second body, (ii) at least one second depth sensor detached from the second body, (iii) a second computer system having a processor, and (iv) the first probability distribution and the second probability distribution;
  (b) by the second body, performing a motion that forms a gesture, the gesture comprising a second series of postures, the second series of postures comprising one or more first postures and one or more second postures, the one or more first postures occurring before the one or more second postures occur;
  (c) in real-time and continuously during the gesture:
    by the at least one second depth sensor, collecting depth measurements of the second body;
    by the at least one second inertial sensor, collecting inertial measurements of the second body; and
    by the processor of the second computer system, determining the series of postures, the determining of the second series of postures comprising, for each respective posture of the second series of postures:
      determining the respective posture, the determining of the respective posture comprising determining and maximizing a probability distribution that assigns probabilities to postures of the second body as a function of depth and inertial measurements of the second body collected at a current time of the respective posture, the probability distribution being recurrently obtained by multiplying the probability distribution that assigns probabilities to postures of the second body as a function of depth and inertial measurements collected at a previous time by the first probability distribution taking as input inertial measurements of the second body collected at the current time and by the second probability distribution taking as input depth measurements of the second body collected at the current time;

wherein the determining of the one or more first postures is performed before the one or more second postures occur.

9. A system comprising:
at least one first inertial sensor attached to a first body;
at least one second inertial sensor attached to a second body;
at least one first depth sensor detached from the first body;

at least one second depth sensor detached from the second body;

a processor; and a memory operatively coupled to the processor and having recorded thereon program code, wherein the processor is configured to execute the program code of:
in an offline stage of machine-learning of a first probability distribution and of a second probability distribution:
(a) providing, (i) at least one first inertial sensor attached to a first body taking postures, (ii) at least one first depth sensor detached from the first body taking postures, and (iii) a first computer system having a processor;
(b) by the first body, performing a motion that forms a first gesture, the first gesture comprising a first series of postures;
(c) in real-time and continuously during the first gesture of the first body:
tracking each respective posture of the first series of postures,
by the at least one first inertial sensor, collecting inertial measurements of the first body,
by the at least one first depth sensor, collecting depth measurements of the first body, and
by the processor of the first computer system, learning the first probability distribution and the second probability distribution, the learning comprising:
constructing a training dataset comprising depth measurements of the first body and inertial measurements of the first body; and
by using the training dataset:
updating parameters of the first probability distribution, the updating of the parameters comprising, for each respective posture of the first series of postures, comparing the tracked respective posture with one or more inertial measurements of the first body, thereby training the first probability distribution to assign probabilities to postures of a moving body as a function of inertial measurements of the moving body;
updating parameters of the second probability distribution, the updating of the parameters comprising, for each respective posture of the first series of postures, comparing the tracked respective posture with one or more depth measurements of the first body, thereby training the first probability distribution to assign probabilities to postures of a moving body as a function of depth measurements of the moving body;
in an online stage of body posture tracking:
(a) providing (i) at least one second inertial sensor attached to a second body, (ii) at least one second depth sensor detached from the second body, (iii) a second computer system having a processor, and (iv) the first probability distribution and the second probability distribution;
(b) by the second body, performing a motion that forms a gesture, the gesture comprising a second series of postures, the second series of postures comprising one or more first postures and one or more second postures, the one or more first postures occurring before the one or more second postures occur;
(c) in real-time and continuously during the gesture:
by the at least one second depth sensor, collecting depth measurements of the second body;
by the at least one second inertial sensor, collecting inertial measurements of the second body; and
by the processor of the second computer system, determining the series of postures, the determining of the second series of postures comprising, for each respective posture of the second series of postures:
determining the respective posture, the determining of the respective posture comprising determining and maximizing a probability distribution that assigns probabilities to postures of the second body as a function of depth and inertial measurements of the second body collected at a current time of the respective posture, the probability distribution being recurrently obtained by multiplying the probability distribution that assigns probabilities to postures of the second body as a function of depth and inertial measurements collected at a previous time by the first probability distribution taking as input inertial measurements of the second body collected at the current time and by the second probability distribution taking as input depth measurements of the second body collected at the current time;
wherein the determining of the one or more first postures is performed before the one or more second postures occur.

10. The system of claim 9, wherein the processor determines a respective posture by repeating at each time that the processor collects depth measurements and/or inertial measurements; and/or
determining a respective posture is repeated at each time that is a multiple of at least one predetermined time step;
the system thereby tracking body motion.

11. The system of claim 9, wherein the depth measurements and the inertial measurements constitute time-series;
wherein determining a respective posture is repeated at each time the method collects depth measurements and/or inertial measurements; and
wherein the learning of the first probability distribution and of the second probability distribution comprises determining data based on which determining a respective posture at each current time is performed, the data including one or more of the depth measurements, the inertial measurements, and the current time of the respective posture.

12. The system of claim 11, wherein the determined data comprise data based on which the method learns the first probability distribution and the second probability distribution.

13. A computer-implemented method for performing body posture tracking, comprising:
an offline stage of machine-learning of a first probability distribution and of a second probability distribution, comprising:
(a) providing, (i) at least one first inertial sensor attached to a first body taking postures, (ii) at least one first depth sensor detached from the first body taking postures, and (iii) a first computer system having a processor;
(b) by the first body, performing a motion that forms a first gesture, the first gesture comprising a first series of postures;
(c) in real-time and continuously during the first gesture of the first body:

tracking each respective posture of the first series of postures, by the at least one first inertial sensor, collecting inertial measurements of the first body, by the at least one first depth sensor, collecting depth measurements of the first body, and by the processor of the first computer system, learning the first probability distribution and the second probability distribution, the learning comprising:

constructing a training dataset comprising depth measurements of the first body and inertial measurements of the first body; and by using the training dataset:

updating parameters of the first probability distribution, the updating of the parameters comprising, for each respective posture of the first series of postures, comparing the tracked respective posture with one or more inertial measurements of the first body, thereby training the first probability distribution to assign probabilities to postures of a moving body as a function of inertial measurements of the moving body;

updating parameters of the second probability distribution, the updating of the parameters comprising, for each respective posture of the first series of postures, comparing the tracked respective posture with one or more depth measurements of the first body, thereby training the first probability distribution to assign probabilities to postures of a moving body as a function of depth measurements of the moving body;

the learnt first probability distribution and second probability distribution being usable in an online stage of body posture tracking comprising:

(a) providing (i) at least one second inertial sensor attached to a second body, (ii) at least one second depth sensor detached from the second body, (iii) a second computer system having a processor, and (iv) the first probability distribution and the second probability distribution;

(b) by the second body, performing a motion that forms a gesture, the gesture comprising a second series of postures, the second series of postures comprising one or more first postures and one or more second postures, the one or more first postures occurring before the one or more second postures occur;

(c) in real-time and continuously during the gesture:

by the at least one second depth sensor, collecting depth measurements of the second body;

by the at least one second inertial sensor, collecting inertial measurements of the second body; and by the processor of the second computer system, determining the series of postures, the determining of the second series of postures comprising, for each respective posture of the second series of postures:

determining the respective posture, the determining of the respective posture comprising determining and maximizing a probability distribution that assigns probabilities to postures of the second body as a function of depth and inertial measurements of the second body collected at a current time of the respective posture, the probability distribution being recurrently obtained by multiplying the probability distribution that assigns probabilities to postures of the second body as a function of depth and inertial measurements collected at a previous time by the first probability distribution taking as input inertial measurements of the second body collected at the current time and by the second probability distribution taking as input depth measurements of the second body collected at the current time;

wherein the determining of the one or more first postures is performed before the one or more second postures occur.

14. A non-transitory computer-readable medium configured to store instructions for performing body posture tracking, the instructions, when loaded and executed by a processor, causing the processor to perform:

an offline stage of machine-learning of a first probability distribution and of a second probability distribution, comprising:

(a) providing, (i) at least one first inertial sensor attached to a first body taking postures, (ii) at least one first depth sensor detached from the first body taking postures, and (iii) a first computer system having a processor;

(b) by the first body, performing a motion that forms a first gesture, the first gesture comprising a first series of postures;

(c) in real-time and continuously during the first gesture of the first body:

tracking each respective posture of the first series of postures, by the at least one first inertial sensor, collecting inertial measurements of the first body, by the at least one first depth sensor, collecting depth measurements of the first body, and by the processor of the first computer system, learning the first probability distribution and the second probability distribution, the learning comprising:

constructing a training dataset comprising depth measurements of the first body and inertial measurements of the first body; and by using the training dataset:

updating parameters of the first probability distribution, the updating of the parameters comprising, for each respective posture of the first series of postures, comparing the tracked respective posture with one or more inertial measurements of the first body, thereby training the first probability distribution to assign probabilities to postures of a moving body as a function of inertial measurements of the moving body;

updating parameters of the second probability distribution, the updating of the parameters comprising, for each respective posture of the first series of postures, comparing the tracked respective posture with one or more depth measurements of the first body, thereby training the first probability distribution to assign probabilities to postures of a moving body as a function of depth measurements of the moving body;

the learnt first probability distribution and second probability distribution being usable in an online stage of body posture tracking comprising:

(a) providing (i) at least one second inertial sensor attached to a second body, (ii) at least one second depth sensor detached from the second body, (iii) a second computer system having a processor, and (iv) the first probability distribution and the second probability distribution;
(b) by the second body, performing a motion that forms a gesture, the gesture comprising a second series of postures, the second series of postures comprising one or more first postures and one or more second postures, the one or more first postures occurring before the one or more second postures occur;
(c) in real-time and continuously during the gesture:
by the at least one second depth sensor, collecting depth measurements of the second body;
by the at least one second inertial sensor, collecting inertial measurements of the second body; and
by the processor of the second computer system, determining the series of postures, the determining of the second series of postures comprising, for each respective posture of the second series of postures:
determining the respective posture, the determining of the respective posture comprising determining and maximizing a probability distribution that assigns probabilities to postures of the second body as a function of depth and inertial measurements of the second body collected at a current time of the respective posture, the probability distribution being recurrently obtained by multiplying the probability distribution that assigns probabilities to postures of the second body as a function of depth and inertial measurements collected at a previous time by the first probability distribution taking as input inertial measurements of the second body collected at the current time and by the second probability distribution taking as input depth measurements of the second body collected at the current time;
wherein the determining of the one or more first postures is performed before the one or more second postures occur.

15. A system comprising:
at least one first inertial sensor attached to a first body;
at least one second inertial sensor attached to a second body;
at least one first depth sensor detached from the first body;
at least one second depth sensor detached from the second body;
a processor; and
a memory operatively coupled to the processor and having recorded thereon program code, wherein the processor is configured to execute the program code of:
an offline stage of machine-learning of a first probability distribution and of a second probability distribution, comprising:
(a) providing, (i) at least one first inertial sensor attached to a first body taking postures, (ii) at least one first depth sensor detached from the first body taking postures, and (iii) a first computer system having a processor;
(b) by the first body, performing a motion that forms a first gesture, the first gesture comprising a first series of postures;
(c) in real-time and continuously during the first gesture of the first body:
tracking each respective posture of the first series of postures,
by the at least one first inertial sensor, collecting inertial measurements of the first body,
by the at least one first depth sensor, collecting depth measurements of the first body, and
by the processor of the first computer system, learning the first probability distribution and the second probability distribution, the learning comprising:
constructing a training dataset comprising depth measurements of the first body and inertial measurements of the first body; and
by using the training dataset:
updating parameters of the first probability distribution, the updating of the parameters comprising, for each respective posture of the first series of postures, comparing the tracked respective posture with one or more inertial measurements of the first body, thereby training the first probability distribution to assign probabilities to postures of a moving body as a function of inertial measurements of the moving body;
updating parameters of the second probability distribution, the updating of the parameters comprising, for each respective posture of the first series of postures, comparing the tracked respective posture with one or more depth measurements of the first body, thereby training the first probability distribution to assign probabilities to postures of a moving body as a function of depth measurements of the moving body;
the learnt first probability distribution and the second probability distribution being usable in an online stage of body posture tracking comprising:
(a) providing (i) at least one second inertial sensor attached to a second body, (ii) at least one second depth sensor detached from the second body, (iii) a second computer system having a processor, and (iv) the first probability distribution and the second probability distribution;
(b) by the second body, performing a motion that forms a gesture, the gesture comprising a second series of postures, the second series of postures comprising one or more first postures and one or more second postures, the one or more first postures occurring before the one or more second postures occur;
(c) in real-time and continuously during the gesture:
by the at least one second depth sensor, collecting depth measurements of the second body;
by the at least one second inertial sensor, collecting inertial measurements of the second body; and
by the processor of the second computer system, determining the series of postures, the determining of the second series of postures comprising, for each respective posture of the second series of postures:
determining the respective posture, the determining of the respective posture comprising determining and maximizing a probability distribution that assigns probabilities to postures of the second body as a function of depth and inertial measurements of the second body collected at a current time of the respective posture, the probability distribution being recurrently obtained by multiplying the probability distribution that assigns probabilities to postures of the second body as a function of depth and inertial measurements collected at a previous time by the first probability distribution taking as input inertial measurements of the second body collected at the current time and by the second probability distribution taking as input depth measurements of the second body collected at the current time;

wherein the determining of the one or more first postures is performed before the one or more second postures occur.

16. A computer-implemented method for performing body posture tracking, comprising:

providing a first probability distribution and a second probability distribution obtainable according to an offline stage of machine-learning of the first probability distribution and of the second probability distribution, the offline stage comprising:
- (a) providing, (i) at least one first inertial sensor attached to a first body taking postures, (ii) at least one first depth sensor detached from the first body taking postures, and (iii) a first computer system having a processor;
- (b) by the first body, performing a motion that forms a first gesture, the first gesture comprising a first series of postures;
- (c) in real-time and continuously during the first gesture of the first body:
  tracking each respective posture of the first series of postures,
  by the at least one first inertial sensor, collecting inertial measurements of the first body,
  by the at least one first depth sensor, collecting depth measurements of the first body, and
  by the processor of the first computer system, learning the first probability distribution and the second probability distribution, the learning comprising:
  constructing a training dataset comprising depth measurements of the first body and inertial measurements of the first body; and
  by using the training dataset:
  updating parameters of the first probability distribution, the updating of the parameters comprising, for each respective posture of the first series of postures, comparing the tracked respective posture with one or more inertial measurements of the first body, thereby training the first probability distribution to assign probabilities to postures of a moving body as a function of inertial measurements of the moving body;
  updating parameters of the second probability distribution, the updating of the parameters comprising, for each respective posture of the first series of postures, comparing the tracked respective posture with one or more depth measurements of the first body, thereby training the first probability distribution to assign probabilities to postures of a moving body as a function of depth measurements of the moving body;

in an online stage of body posture tracking:
- (a) providing (i) at least one second inertial sensor attached to a second body, (ii) at least one second depth sensor detached from the second body, (iii) a second computer system having a processor, and (iv) the first probability distribution and the second probability distribution;
- (b) by the second body, performing a motion that forms a gesture, the gesture comprising a second series of postures, the second series of postures comprising one or more first postures and one or more second postures, the one or more first postures occurring before the one or more second postures occur;
- (c) in real-time and continuously during the gesture:
  by the at least one second depth sensor, collecting depth measurements of the second body;
  by the at least one second inertial sensor, collecting inertial measurements of the second body; and
  by the processor of the second computer system, determining the series of postures, the determining of the second series of postures comprising, for each respective posture of the second series of postures:
  determining the respective posture, the determining of the respective posture comprising determining and maximizing a probability distribution that assigns probabilities to postures of the second body as a function of depth and inertial measurements of the second body collected at a current time of the respective posture, the probability distribution being recurrently obtained by multiplying the probability distribution that assigns probabilities to postures of the second body as a function of depth and inertial measurements collected at a previous time by the first probability distribution taking as input inertial measurements of the second body collected at the current time and by the second probability distribution taking as input depth measurements of the second body collected at the current time;

wherein the determining of the one or more first postures is performed before the one or more second postures occur.

17. A non-transitory computer-readable medium configured to store instructions for performing body posture tracking, the instructions, when loaded and executed by a processor, causing the processor to perform:

providing a first probability distribution and a second probability distribution obtainable according to an offline stage of machine-learning of the first probability distribution and of the second probability distribution, the offline stage comprising:
- (a) providing, (i) at least one first inertial sensor attached to a first body taking postures, (ii) at least one first depth sensor detached from the first body taking postures, and (iii) a first computer system having a processor;
- (b) by the first body, performing a motion that forms a first gesture, the first gesture comprising a first series of postures;
- (c) in real-time and continuously during the first gesture of the first body:
  tracking each respective posture of the first series of postures,
  by the at least one first inertial sensor, collecting inertial measurements of the first body,
  by the at least one first depth sensor, collecting depth measurements of the first body, and
  by the processor of the first computer system, learning the first probability distribution and the second probability distribution, the learning comprising:
  constructing a training dataset comprising depth measurements of the first body and inertial measurements of the first body; and
  by using the training dataset:
  updating parameters of the first probability distribution, the updating of the parameters comprising, for each respective posture of the first series of postures, comparing the tracked respective posture with one or more inertial measurements of the first body, thereby training the first probability distribution to assign probabilities to postures of a moving body as a function of inertial measurements of the moving body;

updating parameters of the second probability distribution, the updating of the parameters comprising, for each respective posture of the first series of postures, comparing the tracked respective posture with one or more depth measurements of the first body, thereby training the first probability distribution to assign probabilities to postures of a moving body as a function of depth measurements of the moving body;

in an online stage of body posture tracking:
(a) providing (i) at least one second inertial sensor attached to a second body, (ii) at least one second depth sensor detached from the second body, (iii) a second computer system having a processor, and (iv) the first probability distribution and the second probability distribution;
(b) by the second body, performing a motion that forms a gesture, the gesture comprising a second series of postures, the second series of postures comprising one or more first postures and one or more second postures, the one or more first postures occurring before the one or more second postures occur;
(c) in real-time and continuously during the gesture:
by the at least one second depth sensor, collecting depth measurements of the second body;
by the at least one second inertial sensor, collecting inertial measurements of the second body; and
by the processor of the second computer system, determining the series of postures, the determining of the second series of postures comprising, for each respective posture of the second series of postures:
determining the respective posture, the determining of the respective posture comprising determining and maximizing a probability distribution that assigns probabilities to postures of the second body as a function of depth and inertial measurements of the second body collected at a current time of the respective posture, the probability distribution being recurrently obtained by multiplying the probability distribution that assigns probabilities to postures of the second body as a function of depth and inertial measurements collected at a previous time by the first probability distribution taking as input inertial measurements of the second body collected at the current time and by the second probability distribution taking as input depth measurements of the second body collected at the current time;
wherein the determining of the one or more first postures is performed before the one or more second postures occur.

18. A system comprising:
at least one first inertial sensor attached to a first body;
at least one second inertial sensor attached to a second body;
at least one first depth sensor detached from the first body;
at least one second depth sensor detached from the second body;
a processor; and a memory operatively coupled to the processor and having recorded thereon program code, wherein the processor is configured to execute the program code of:
providing a first probability distribution and a second probability distribution obtainable according to an offline stage of machine-learning of the first probability distribution and of the second probability distribution, the offline stage comprising:
(a) providing, (i) at least one first inertial sensor attached to a first body taking postures, (ii) at least one first depth sensor detached from the first body taking postures, and (iii) a first computer system having a processor;
(b) by the first body, performing a motion that forms a first gesture, the first gesture comprising a first series of postures;
(c) in real-time and continuously during the first gesture of the first body:
tracking each respective posture of the first series of postures,
by the at least one first inertial sensor, collecting inertial measurements of the first body,
by the at least one first depth sensor, collecting depth measurements of the first body, and
by the processor of the first computer system, learning the first probability distribution and the second probability distribution, the learning comprising:
constructing a training dataset comprising depth measurements of the first body and inertial measurements of the first body; and
by using the training dataset:
updating parameters of the first probability distribution, the updating of the parameters comprising, for each respective posture of the first series of postures, comparing the tracked respective posture with one or more inertial measurements of the first body, thereby training the first probability distribution to assign probabilities to postures of a moving body as a function of inertial measurements of the moving body;
updating parameters of the second probability distribution, the updating of the parameters comprising, for each respective posture of the first series of postures, comparing the tracked respective posture with one or more depth measurements of the first body, thereby training the first probability distribution to assign probabilities to postures of a moving body as a function of depth measurements of the moving body;
in an online stage of body posture tracking:
(a) providing (i) at least one second inertial sensor attached to a second body, (ii) at least one second depth sensor detached from the second body, (iii) a second computer system having a processor, and (iv) the first probability distribution and the second probability distribution;
(b) by the second body, performing a motion that forms a gesture, the gesture comprising a second series of postures, the second series of postures comprising one or more first postures and one or more second postures, the one or more first postures occurring before the one or more second postures occur;
(c) in real-time and continuously during the gesture:
by the at least one second depth sensor, collecting depth measurements of the second body;

by the at least one second inertial sensor, collecting inertial measurements of the second body; and by the processor of the second computer system, determining the series of postures, the determining of the second series of postures comprising, for each respective posture of the second series of postures:

determining the respective posture, the determining of the respective posture comprising determining and maximizing a probability distribution that assigns probabilities to postures of the second body as a function of depth and inertial measurements of the second body collected at a current time of the respective posture, the probability distribution being recurrently obtained by multiplying the probability distribution that assigns probabilities to postures of the second body as a function of depth and inertial measurements collected at a previous time by the first probability distribution taking as input inertial measurements of the second body collected at the current time and by the second probability distribution taking as input depth measurements of the second body collected at the current time;

wherein the determining of the one or more first postures is performed before the one or more second postures occur.

* * * * *